(12) United States Patent
Davraev et al.

(10) Patent No.: US 12,657,302 B2
(45) Date of Patent: Jun. 16, 2026

(54) LATENT-CONTEXT ALERT CORRELATION ENGINE IN A SECURITY MANAGEMENT SYSTEM

(71) Applicant: Microsoft Technology Licensing, LLC, Redmond, WA (US)

(72) Inventors: Daniel Davraev, Or Yehuda (IL); Tamer Salman, Haifa (IL); Ram Haim Pliskin, Rishon Lezion (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 301 days.

(21) Appl. No.: 18/183,783

(22) Filed: Mar. 14, 2023

(65) Prior Publication Data

US 2024/0311483 A1    Sep. 19, 2024

(51) Int. Cl.
*G06F 21/57* (2013.01)

(52) U.S. Cl.
CPC ........ *G06F 21/57* (2013.01); *G06F 2221/034* (2013.01)

(58) Field of Classification Search
CPC ............................ G06F 21/57; G06F 2221/034
See application file for complete search history.

(56) References Cited

U.S. PATENT DOCUMENTS

| | | | | |
|---|---|---|---|---|
| 10,530,796 | B2 * | 1/2020 | Patterson | G06F 21/554 |
| 10,742,667 | B1 * | 8/2020 | Stern | H04L 63/1425 |
| 2016/0301704 | A1 * | 10/2016 | Hassanzadeh | G06F 21/64 |
| 2017/0288974 | A1 * | 10/2017 | Yoshihira | G06F 21/552 |
| 2017/0288979 | A1 * | 10/2017 | Yoshihira | H04L 41/142 |
| 2018/0234310 | A1 * | 8/2018 | Ingalls | H04L 43/045 |
| 2019/0379684 | A1 * | 12/2019 | Brown | H04L 63/20 |
| 2020/0322361 | A1 * | 10/2020 | Ravindra | G06F 40/279 |
| 2021/0081539 | A1 | 3/2021 | Karin | |
| 2021/0352095 | A1 * | 11/2021 | Cam | G06N 3/006 |

(Continued)

OTHER PUBLICATIONS

International Search Report and Written Opinion received for PCT Application No. PCT/US2024/018582, Jun. 13, 2024, 18 pages.

(Continued)

*Primary Examiner* — Carl G Colin
*Assistant Examiner* — Zhe Liu
(74) *Attorney, Agent, or Firm* — Shook, Hardy & Bacon L.L.P.

(57) ABSTRACT

Methods, systems, and computer storage media for providing security incident management using a latent-context alert correlation engine in a security management system. Security incident management is provided using the latent-context alert correlation engine that is operationally integrated into the security management system. In operation, first security data of a first alert and second security data of a second alert are accessed. The first alert and the second alert do not share a common entity identifiable in a security graph. Using the first security data and the second security data, a determination is made that the first alert is connected to the second alert based on a latent-context connection. The latent-context connection is a known attack path connection that indirectly connects alerts. Based on determining that the first alert is connected to the second alert, a security incident is generated for the alert. A notification comprising the security incident is communicated.

20 Claims, 11 Drawing Sheets

(56) References Cited

U.S. PATENT DOCUMENTS

| | | | |
|---|---|---|---|
| 2023/0017839 A1* | 1/2023 | Mizushima | G06F 21/552 |
| 2023/0087267 A1* | 3/2023 | Shi | G06F 16/2237 |
| | | | 726/23 |
| 2024/0070291 A1* | 2/2024 | Lee | G06F 21/567 |

OTHER PUBLICATIONS

Johnson, et al., "What is Microsoft Intelligent Security Graph? 1 TechTarget," Retrieved from the Internet: URL:https://www.techtarget. com/searchenterprisedesktop/opinion/What-is-Microsoft-Intelligent-Security-Graph, Jan. 16, 2019, 2 Pages.
International Preliminary Report on Patentability (Chapter I) received for PCT Application No. PCT/US2024/018582, mailed on Sep. 25, 2025, 12 pages.

* cited by examiner

100

LATENT-CONTEXT ALERT CORRELATION ENGINE
110

ATTACK PATH DEFINITIONS ENGINE
140

LATENT-CONTEXT ALERT CORRELATION GRAPH MODEL
150

LATENT-CONTEXT CONNECTION DATA API
160

SECURITY MANAGEMENT CLIENT
130

INCIDENT MANAGEMENT CLIENT
132

SECURITY INCIDENT INTERFACE DATA
134

SECURITY MANAGEMENT SYSTEM 100A

LATENT-CONTEXT ALERT CORRELATION ENGINE 110

ATTACK PATH DEFINITIONS ENGINE 140

LATENT-CONTEXT ALERT CORRELATION GRAPH MODEL 150

LATENT-CONTEXT CONNECTION DATA API 160

SECURITY INCIDENT MANAGEMENT ENGINE 120

SECURITY GRAPH API 122

SECURITY MANAGEMENT CLIENT 130

INCIDENT MANAGEMENT CLIENT 132

SECURITY INCIDENT INTERFACE DATA 134

300

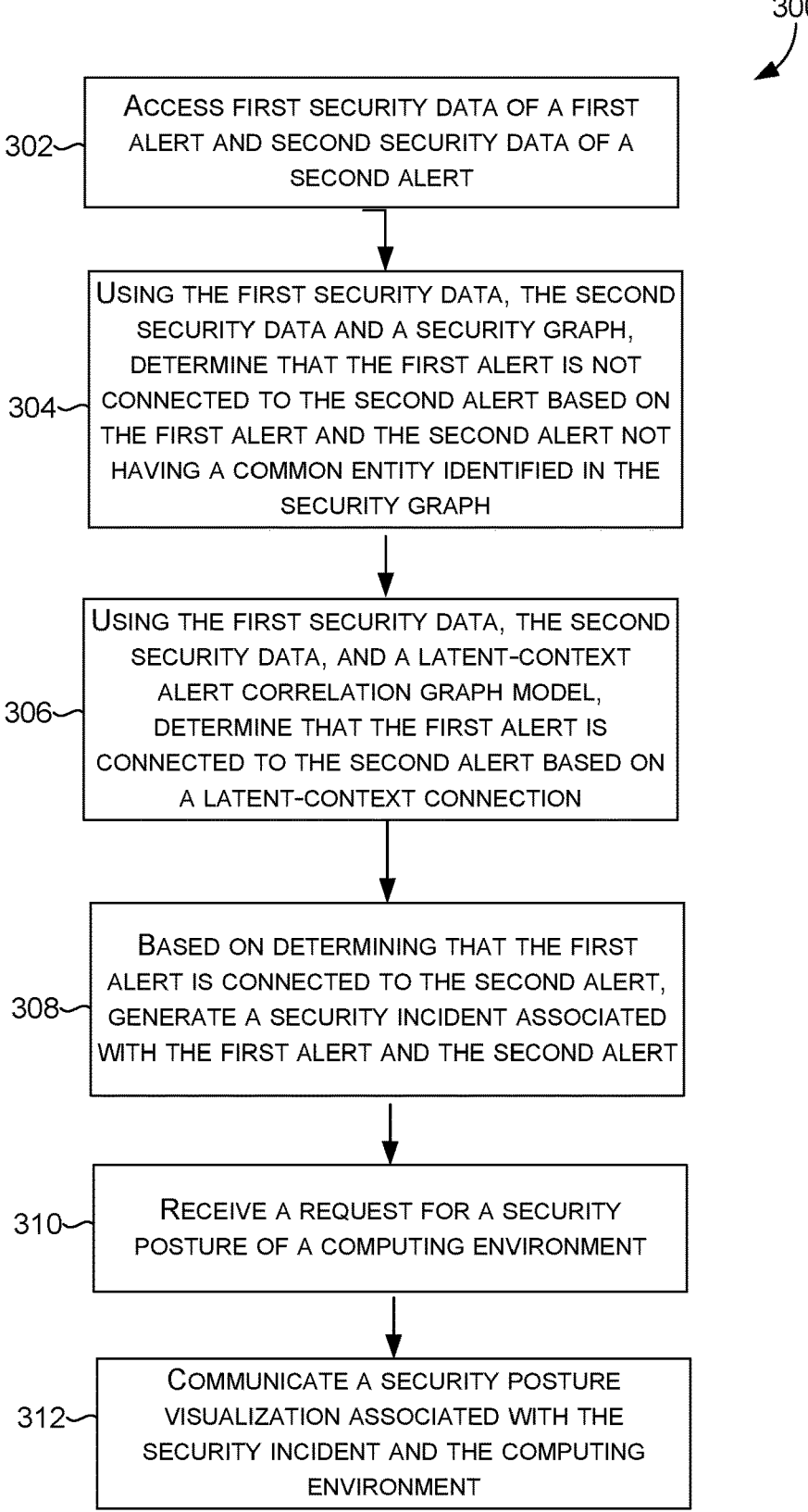

302~    ACCESS FIRST SECURITY DATA OF A FIRST ALERT AND SECOND SECURITY DATA OF A SECOND ALERT

304~    USING THE FIRST SECURITY DATA, THE SECOND SECURITY DATA AND A SECURITY GRAPH, DETERMINE THAT THE FIRST ALERT IS NOT CONNECTED TO THE SECOND ALERT BASED ON THE FIRST ALERT AND THE SECOND ALERT NOT HAVING A COMMON ENTITY IDENTIFIED IN THE SECURITY GRAPH

306~    USING THE FIRST SECURITY DATA, THE SECOND SECURITY DATA, AND A LATENT-CONTEXT ALERT CORRELATION GRAPH MODEL, DETERMINE THAT THE FIRST ALERT IS CONNECTED TO THE SECOND ALERT BASED ON A LATENT-CONTEXT CONNECTION

308~    BASED ON DETERMINING THAT THE FIRST ALERT IS CONNECTED TO THE SECOND ALERT, GENERATE A SECURITY INCIDENT ASSOCIATED WITH THE FIRST ALERT AND THE SECOND ALERT

310~    RECEIVE A REQUEST FOR A SECURITY POSTURE OF A COMPUTING ENVIRONMENT

312~    COMMUNICATE A SECURITY POSTURE VISUALIZATION ASSOCIATED WITH THE SECURITY INCIDENT AND THE COMPUTING ENVIRONMENT

FIG. 3

402 — ACCESS A PLURALITY OF ATTACK PATH DEFINITIONS

400

404 — BASED ON THE PLURALITY OF ATTACK PATH DEFINITIONS, IDENTIFY A PLURALITY OF LATENT-CONTEXT CONNECTIONS FOR A LATENT-CONTEXT ALERT CORRELATION GRAPH MODEL

406 — DEPLOY THE LATENT-CONTEXT ALERT CORRELATION GRAPH MODEL TO SUPPORT IDENTIFYING LATENT-CONTEXT CONNECTIONS BETWEEN ALERTS

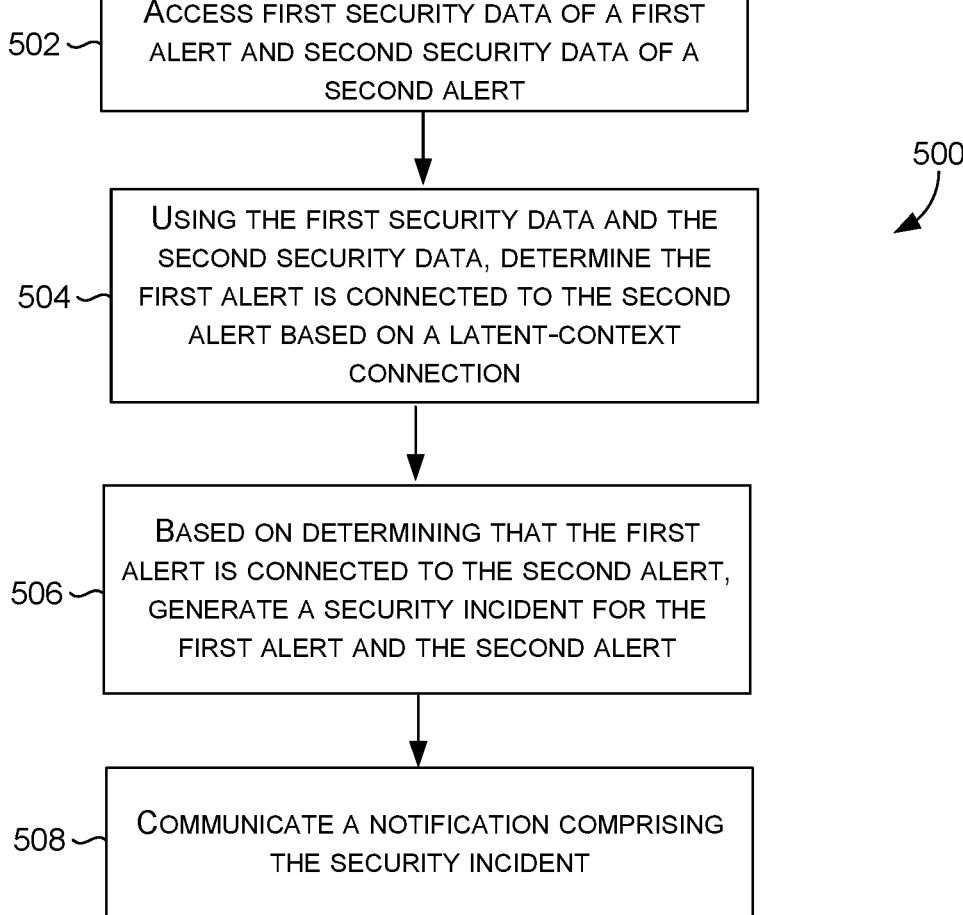

502 — ACCESS FIRST SECURITY DATA OF A FIRST ALERT AND SECOND SECURITY DATA OF A SECOND ALERT

500

504 — USING THE FIRST SECURITY DATA AND THE SECOND SECURITY DATA, DETERMINE THE FIRST ALERT IS CONNECTED TO THE SECOND ALERT BASED ON A LATENT-CONTEXT CONNECTION

506 — BASED ON DETERMINING THAT THE FIRST ALERT IS CONNECTED TO THE SECOND ALERT, GENERATE A SECURITY INCIDENT FOR THE FIRST ALERT AND THE SECOND ALERT

508 — COMMUNICATE A NOTIFICATION COMPRISING THE SECURITY INCIDENT

MEMORY

712

PROCESSOR(S)

714

PRESENTATION
COMPONENT(S)

716

I/O PORT(S)

718

I/O COMPONENTS

720

POWER SUPPLY

722

710

LATENT-CONTEXT ALERT CORRELATION ENGINE IN A SECURITY MANAGEMENT SYSTEM

BACKGROUND

Users rely on computing environments with applications and services to accomplish computing tasks. Distributed computing systems host and support different types of applications and services in managed computing environments. In particular, computing environments can implement a security management system that provides security incident management functionality and supports threat protection in the computing environments. For example, cloud security incident management (CSPM) can include identifying and remediating risk by automating visibility, executing uninterrupted monitoring and threat detection, and providing remediation workflows to search for misconfigurations across diverse cloud computing environments and infrastructure.

SUMMARY

Various aspects of the technology described herein are generally directed to systems, methods, and computer storage media for, among other things, providing security incident management using a latent-context alert correlation engine of a security management system. Security incident management supports security management of a computing environment based on correlating multiple alerts—for example, for an ongoing threat—and presenting the alerts as part of a single incident. Security incident management is provided using the latent-context alert correlation engine that is operationally integrated into the security management system. The security management system supports a latent-context alert correlation framework of computing components associated with generating, identifying, and employing a latent-context for determining whether alerts should be correlated as part of a single incident.

The latent-context can refer to an indirect connection between alerts, the indirect connection is a known latent-context connection. In particular, the latent-context connection can be derived from attack path analysis of historical alerts, for example, other historical alerts that do not have common entities, but share an indirect connection (e.g., permissions, contains, connectivity, installed) that are identified based on analyzing attack paths. The latent-context alert correlation engine operates to provide security incident management based on accessing a first alert and a second alert—that are not related based on a common entity, and determining that the first alert and the second alert are related based on a latent-context connection. For example, a security administrator can investigate an ongoing threat in a computing environment—based on incident management information—that identifies a security incident having a first alert that is correlated with a second alert. The alerts are correlated based on latent-context alert correlation management operations that employ a latent-context connection—not entities of a initial security graph—to correlate the first alert and the second alert.

Conventionally, security management systems are not configured with a comprehensive computing logic and infrastructure to provide adequate correlation of alerts in a computing environment. For example, alerts in a computing environment can be presented independently—and not part of a single incident—because the security management system lacks integration with latent-context alert correlation management operations. Moreover, merely determining incidents for related alerts based on common entities—without additional latent-context correlation—may cause threats associated with the alerts to be overlooked which can lead to unauthorized access to data in the computing environment and malicious operations in the computing environment.

A technical solution—to the limitations of conventional security management systems—can include the challenge of generating, identifying, and employing a latent-context for determining whether alerts should be correlated as part of a single incident, and providing security management operations and interfaces—via a latent-context alert correlation engine that provides a latent-context alert correlation management in a security management system. As such, the security management system can be improved based on latent-context alert correlation management operations in the security management system that operate to summarize and provide security incident management information of a computing environment in a particular manner.

In operation, first security data of a first alert and second security data of a second alert are accessed. Using the first security data, the second security data, and a security graph, a determination is made that the first alert is not connected to the second alert based on the first alert and the second alert not having a common entity identified in the security graph. Using the first security data, the second security data, and a latent-context alert correlation graph model, a determination is made that the first alert is connected to the second alert based on a latent-context connection. Based on determining that the first alert is connected to the second alert, a security incident associated with the first alert and the second alert is generated. A notification comprising the security incident is communicated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIG. 3 provides a first exemplary method of providing security incident management using a latent-context alert correlation engine, in accordance with aspects of the technology described herein;

FIG. 5 provides a third exemplary method of providing security incident management using a latent-context alert correlation engine, in accordance with aspects of the technology described herein;

Figure 1A:
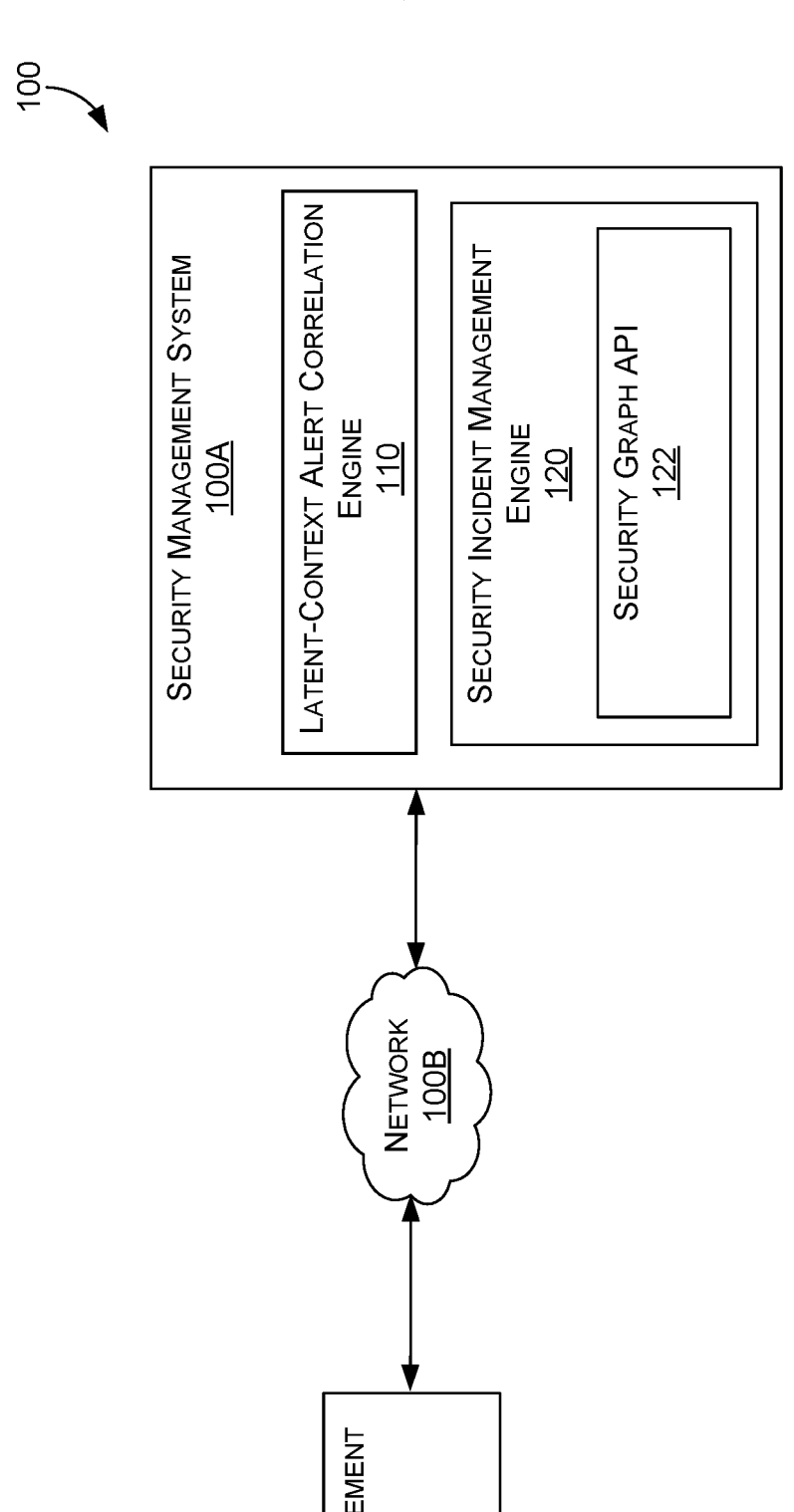
FIGS. 1A and 1B are block diagrams of an exemplary security management system for providing security incident management using a latent-context alert correlation engine, in accordance with aspects of the technology described herein.

DETAILED DESCRIPTION OF THE
INVENTION

Overview

A security management system supports management of security aspects of resources and workloads in computing environments. The security management system can help enable protection against threats, help reduce risk across different types of computing environments, and help strengthen a security posture of computing environments—i.e., security status and remediation action recommendations for computing resources including networks and devices. For example, the security management system can provide real-time security alerts, centralize insights for different resources, and provide for preventative protection, post-breach detection, and automated investigation, and response.

Conventionally, security management systems are not configured with a comprehensive computing logic and infrastructure to provide adequate correlation of alerts in a computing environment. For example, alerts in a computing environment can be presented independently—and not part of a single incident—because the security management system lacks integration with latent-context alert correlation management operations. In addition, without additional latent-context correlation, threats associated with the alerts may be overlooked which can lead to unauthorized access to data in the computing environment and malicious operations in the computing environment.

Moreover, merely determining incidents for related alerts based on common entities—without additional latent-context correlation—causes deficient functioning of the security management system. In particular, alert incident information for only alerts with common entities does not adequately present the security posture information in a manner that efficiently encapsulates the security posture of a computing environment. As such, a more comprehensive security management system—with an alternative basis for performing secure management operations—can improve computing operations and interfaces in security management systems.

Embodiments of the present invention are directed to systems, methods, and computer storage media for, among other things, providing security incident management using a latent-context alert correlation engine of a security management system. Security incident management supports security management of a computing environment based on correlating multiple alerts—for example, for an ongoing threat—and presenting the alerts as part of a single incident. Security incident management is provided using the latent-context alert correlation engine that is operationally integrated into the security management system. The security management system supports a latent-context alert correlation framework of computing components associated with generating, identifying, and employing a latent-context for determining whether alerts should be correlated as part of a single incident.

The latent-context can refer to an indirect connection between alerts, the indirect connection is a known latent-context connection. In particular, the latent-context connection can be derived from attack path analysis of historical alerts, for example, other historical alerts that do not have common entities, but share an indirect connection (e.g., permissions, contains, connectivity, and installed on) that are identified based on analyzing attack paths. In this way, any deficiencies in correlating alerts—from a security graph using security graph data—can be cured based on latent-context connections, latent-context connection data, and a latent-context alert correlation graph model that is generated based on historical alerts and attack path analysis.

The latent-context alert correlation engine operates to provide security incident management based on accessing a first alert and a second alert—that are not related based on a common entity in a security graph, and determining that the first alert and the second alert are related based on a latent-context. For example, a security administrator can investigate an ongoing threat in a computing environment based on security incident management information that identifies a security incident having a first alert that is correlated with a second alert. The alerts are correlated based on latent-context alert correlation management operations that employ a latent-context connection to correlate the first alert and the second alert. The alerts can further be correlated using latent-context connection data associated with the alerts and a latent-context alert correlation graph model and a corresponding latent-context alert correlation graph that connects the alerts via nodes and edges associated with the latent-context connection data.

At a high level, a security management system supports communicating to a cloud computing platform customer any security issues in their cloud computing environment. The security management system is configured to trigger alerts for potential or actual threats—including suspicious behavior or malicious behavior—in a computing environment. For example, an alert configuration can be defined to include alert settings, which if met, trigger an alert. The security alert can refer to a human-readable, technical notification regarding current vulnerabilities, exploits, and other security issues associated with a computing environment. The alert can be communicated to a client device that is managed by a security administrator who can then follow up on the alert.

Different types of potential threats and actual threats exist, for example, use of proxies to gain access to a computing environment or unauthorized running of crypto mining software in a computing environment. An attack on a cloud computing environment—for example, performed by a malicious actor—can include several attack operations that are executed to gain access to resources on the cloud computing environment. The attack operations can trigger alerts, when the security system is configured to monitor for these types of attack operations. If multiple attack operations are identified—and a determination that the attack operations are related is made—the alerts associated with the attack operations can be defined as a security incident. The security incident can refer to a collection of correlated alerts and corresponding security data that make up a story of an attack. The attack story can be associated with a security graph and an attack path definition that identifies attack objects (e.g., attack operations, compromised resources, file locations and file types). The attack path definition can describe how an attacker gained access to a computing environment and related operations and computing resources associated with the attack and unauthorized access. A security incident can advantageously combine multiple alerts associated with a single attack to support managing and responding to the security incident.

A security graph (e.g., MICROSOFT's Intelligent Security Graph) can be provided as a component that provides telemetry data associated with a plurality of resources in a computing environment. The security graph may implement machine learning to generate actionable security alerts and recommendations. The security graph can be associated with an Application Programming Interface (API) that operates as an intermediary service to access a shared schema of aggregated security information from a plurality of security providers in a computing environment. In this way, the security graph and the security graph API can support integrating security alerts from different security providers via an API connector that streams alerts to a security management system.

In practice, it can be challenging to determine that different alerts are part of the same attack, such that, they are grouped into a single incident. One way of correlating alerts can be based on identifying entities—i.e., tracked security information associated with an alert—that are common in alerts. For example, a first alert and a second alert may share the same IP address entity, such that, the first alert and the second alert are grouped as part of the same incident. Tracked security information can include a set of standard tracked information (e.g., date, time) and a set of alert-specific information (e.g., username, source resource, target resource, IP address, filename, and directory). Correlating alerts can be even more challenging when the alerts do not share a common entity (e.g., username, IP address, resource, file information). For example, an attack may trigger a first alert that is associated with a username accessing a virtual machine via proxy—and trigger a second alert that is associated with an anonymous—but unauthorized—shared access signature "SAS" key access to a database. However, without a shared entity, the first alert and the second alert are not grouped into a security incident.

A first alert and a second alert that are not connected based on a shared entity (i.e., not having a common entity) in a security graph can be correlated based on performing latent-context alert correlation management operations. First alert data of the first alert and the second alert data of the second alert can be retrieved based on a security graph. The security graph can provide security data associated with the first alert and the second alert. The first alert and the second alert can be associated with an indication that the first alert and the second alert are not connected. Alternatively, a determination can be made that the first alert and the second alert are not correlated based on not having a common entity in the security graph.

As an initial matter, in order to determine whether the first alert and the second alert are connected to each other—based on a latent-context (e.g., a latent-context connection data) not identified in the security graph—a plurality of latent-context connection types can initially be identified. In particular, the plurality of latent-context connection types can be based on attack path definitions. An attack path definition can refer to a known set of attack objects (e.g., computing resources and components) that are implicated with different types of attacks. Attack path definitions can specifically be associated with security incidents, where two alerts and their corresponding attack objects, and latent-context connections are identifiable for the alerts (e.g., alerts without a common entity in a security graph).

By way of example, an attack path analysis-using a graph—based algorithm—scans a cloud security graph to identify exploitable paths that attackers may use to breach a computing environment. The attack path analysis exposes attack paths and suggests remediation actions for issues that would break the attack path and prevent a successful breach. In this way, an attack path definition can include attack objects that create an attack story for security incidents and their derived latent-context connections. For example, the attack path definitions include identified latent-context connections including having permissions to a resource (permissions); containing a resource (contains); having connectivity to a resource (connectivity), and having an installed resource (installed on). The latent-context connections are not identifiable via a security graph using security data; however these latent-context connections are derived from historical alerts that are unrelated via common entities in the security graph.

A latent-context alert correlation graph model can be generated based on the attack objects, latent-connection data, and latent-context connections of the attack path definitions. The latent-context alert correlation graph model is a graphical representation of the resources and latent-context connections via nodes and edges to show the relationship between alerts. The latent-context alert correlation graph model can be used to represent security data from alerts that are not correlated; however the alerts can further be correlated based on latent-context connections associated with the alerts. Latent-context connection data can be retrieved for resources identified in the security data for the alerts, such that, the resources are mapped based on the latent-context connection data and specifically a latent-context connection between resources associated with the alerts.

As such, a determination can be made that a resource associated with a first alert is connected to a resource associated with a second alert, based on a latent-context connection. For example, a username may access a virtual machine via a proxy that triggers a first alert, and a second alert that is associated with an anonymous access to a database in a computing environment is triggered. Using a security graph, the first alert and the second alert are not correlated (e.g., because of lack of a common entity); however, with a permissions latent-context connection, a determination is made that the username has permissions to the database—as such, causing the first alert and the second alert to be correlated.

Moreover, the correlation can be associated with an inference score (e.g., low, medium, high) based on a type of latent-context connection and corresponding latent-context connection data. For example, if the latent-context connection data indicates that the username is the only username configured to access to the database then the inference score can be high; however, if multiple other usernames have access to the database then the inference score can be medium or low.

Advantageously, the embodiments of the present invention include several inventive features (e.g., operations, systems, engines, and components) associated with a security management system having the latent-context alert correlation engine. Inventive features will be described with reference to operations for providing security incident management information using a latent-context alert correlation engine in a security management system. Functionality of the embodiments of the present invention will further be described, by way of an implementation and anecdotal examples, to demonstrate that the security incident management operations—(e.g., generating, identifying, and employing a latent-context for determining whether alerts should be correlated as part of a single incident)—are a solution to a specific problem in a cloud computing system to improve computing operations and interface for security management systems. For example, the operations provide an improved user interface that summarizes and presents security incident management information—associated with latent-context correlated alerts—in a particular manner to facilitate security incident management. Overall, these improvements result in less CPU computation, smaller memory requirements, and increased flexibility in security management systems.

Example Systems and Operations

Aspects of the technical solution can be described by way of examples and with reference to FIGS. 1A-1D. FIG. 1A illustrates a cloud computing environment (system) 100 and security management system 100A. The security management system 100A includes network 110B, latent-context alert correlation engine 110, security incident management engine 120 with security incident graph API 122, and security management client 130.

The cloud computing environment 100 provides computing system resources for different types of managed computing environments. For example, the cloud computing environment 100 supports delivery of computing services—including servers, storage, databases, networking, and security intelligence. A plurality of security management clients (e.g., security management client 130) include hardware or software that access resources in the cloud computing environment 100. Security management client 130 can include an application or service that supports client-side functionality associated with cloud computing environment 100. The plurality of security management clients can access computing components of the cloud computing environment 100 via a network (e.g., network 100B) to perform computing operations.

The security management system 100A is designed to provide security incident management using the latent-context alert correlation engine 110. The security management system 100A provides an integrated operating environment based on a security management framework of computing components associated with generating, identifying, and employing a latent-context for determining whether alerts should be correlated as part of a single incident. The security management system 100A integrates latent-context alert correlation management operations—that correlate alerts based on latent-context connections—into security management operations and interfaces to effectively provide security incident information and security posture information and remediation information for a computing environment. For example, a security administrator can investigate an ongoing threat in a computing environment based on incident management information that identifies a security incident having a first alert that is correlated with a second alert. The alerts are correlated based on latent-context alert correlation management operations that employ a latent-context connection to correlate the first alert and the second alert.

The latent-context alert correlation engine 110 is responsible for providing security incident management based on latent-context alert correlation management operations. The latent-context alert correlation engine 110 operates with security management system components (e.g., security incident management engine 120) to provide security incident management. The security incident management engine 120 operates to provide visibility to security status of resources in a computing environment. The security posture can be associated with network, data, and identity resources of a computing environment.

The security incident management engine 120 includes a security graph API 122 that provides access to a security graph and security graph data. The security graph provides telemetry data associated with a plurality of resources in a computing environment. In particular, the telemetry data can be security data that is associated with security providers in a computing environment. The security graph and security graph API can support integrating security alerts from different security providers via an API connector that streams alerts to the security incident management engine.

The security incident management engine 120 can further support generating security posture visualizations based on the security posture information including security data for alerts and their corresponding latent-context connection data, security incidents, and security incident management data. For example, a security posture visualization can provide and prioritize different alerts based at least on part on secure posture information (e.g., security incident management data, latent-context connection data and inference scores) associated with the latent-context alert correlation. The secure posture visualization can further include remediation actions associated different alerts—including alerts that are associated with security incidents.

Advantageously, alerts are properly correlated as security incidents and provided with remediation actions that can be selected and communicated to cause the remediation action to be performed. The remediation action can address an actual threat or potential threat associated with the security incident and alert. For example, a remediation action can include off-boarding a computing device, disabling a user, quarantining a file; turning off external email, or running an antivirus scan. Other variations and combinations of security posture visualizations with security incidents, alerts, and remediation actions are contemplated with embodiments described herein.

Figure 1B:
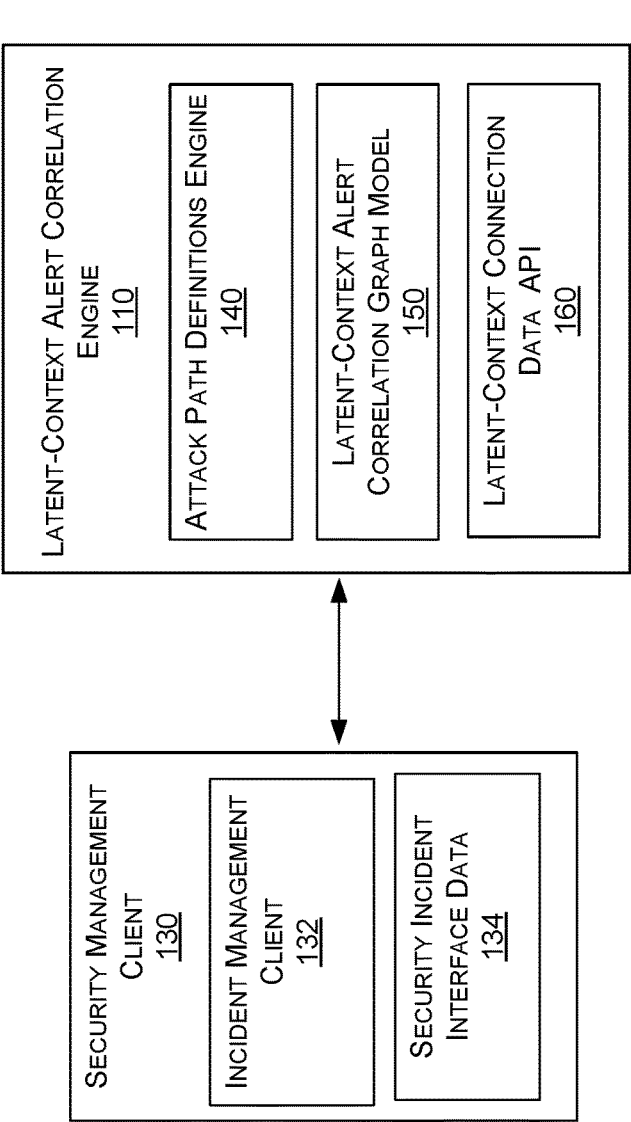

With reference to FIG. 1B, FIG. 1B illustrates latent-context alert correlation engine 110—having attack path definitions engine 140, latent-context alert correlation graph model 150, latent-context connection data API 160 and security management client 130 having incident management client 132 and security incident interface data 134.

The latent-context alert correlation engine 110 is responsible for communicating with a security management client 130 having a latent-context alert correlation engine client 132. The latent-context alert correlation engine client 132 supports client-side security incident management operations for providing security management in the security management system. The latent-context alert correlation engine client 132 can support generating, identifying, and employing a latent-context for determining whether alerts should be correlated as part of a single incident and presenting a security posture visualization, and communicating an indication to perform a remediation action for an alert associated with a security incident. In this way, latent-context alert correlation data and security posture information can be communicated between the latent-context alert correlation engine 110, the security incident management engine 120, and the security management client 130.

The latent-context alert correlation engine 110 provides an attack path definitions engine 140, a latent-context alert correlation graph model 150, and latent-context connection data API 160 that interoperate to provide latent-context alert correlation management operations. The attack path definitions engine 140 supports identifying latent-context connections between alerts that are not correlated using a security graph. The attack path definitions engine 140 accesses a plurality of attack path definitions. The attack path definition includes known attack objects that are associated with a type of attack on a computing environment. The attack objects support understanding an attack story of an attack. Based on the plurality of attack path definitions, the attack path definition engine 140 identifies a plurality of latent-context connections for the latent-context alert correlation graph model 150. The attack path definition engine 140 deploys the latent-context alert correlation graph model to support identifying latent-context connections between alerts. The latent-context alert correlation graph model supports graphing security data of alerts that are not correlated based on a security graph and security graph data. Using the latent-context alert correlation graph model a latent-context alert correlation graph can be generated for the alerts to determine whether a latent-context exists between the alerts. In this way, a first set of alerts may be evaluated with an outcome indicating that the alerts can be correlated based on one or more latent-context connections; and a second set of alert may be evaluated with an different outcome indicating that the alerts cannot be correlated based on one or more latent-context connections.

The latent-context alert correlation engine 110 operates with the security incident management engine 120 to correlate alert. The security incident management engine 120 can receive a plurality of alerts having security data and a determination is made that a first alert and second alert are connected (e.g., via security graph); and a third alert and fourth alert are not connection. The latent-context alert correlation graph model and the latent-context connection data API support evaluating alerts—that do not have an entity in common on a security graph—for latent-context connections. The latent-context alert correlation graph model 150 supports mapping security data associated with the alerts to determine if alerts (e.g., third and fourth alert) are connected based on latent-context connections. The latent-context alert correlation graph model 150 further operates with the latent-context connection data API 160 to retrieve additional data (e.g., latent-context connection data) associated with alerts to determine if the alerts are connected via a latent-context connection. Additional data can be retrieved from informational databases in a computing environment. For example, a cloud computing provider can maintain additional data in different types of databases (e.g., active directory, subscription database, and logging databases). The additional data can be retrieved via the latent-context connection data API to support identifying latent-context connections using the latent-context alert correlation graph model 150.

In operation, the latent-context alert correlation engine 110 accesses first security data of a first alert and second security data of a second alert. Using the first security data, the second security data, and a latent-context alert correlation graph model 160, the latent-context alert correlation engine 110 determines that the first alert is connected to the second alert based on a latent-context connection. The latent-context connection is a derived attack-path-based connection that maps security data in a latent-context alert correlation graph. The latent-context alert correlation graph model may cause additional data (i.e., latent-context connection data) to be retrieved via the latent-context connections API to support determining that the first alert and the second alert are connected based on a latent-context connection. Based on a determination that the first alert and second alert are connected via a latent-context connection, the latent-context alert correlation engine 140 generates a security incident associated with a first alert and a second alert.

The security incident management engine 120 operates with the latent-context alert correlation engine 110 to generate a security incident. For example, a notification including the security incident can be generated and communicated to the security management client 130. The security management client 130 can support accessing a security posture visualization and causing display of the security posture visualization. The security management client 130 can include an incident management client 132 that supports receiving the security incident interface data 134 from the security management system 110A and causing presentation of the security incident interface data 134. The security incident interface data 134 can specifically include security posture visualization associated with the security incident. The security incident interface data can include security incidents identified via the security graph and security incidents identified via the latent-context alert correlation graph model 150.

The security management client 130 supports communicating a request for a security posture the computing environment. Based on the request, the security management client 130 receives a security posture visualization associated with the computing environment. The security posture visualization can include a first alert associated with a security incident that is correlated with a second alert based on a latent-context connection. The security management client 130 can cause display of the security posture visualization.

The security management client 130 can further support executing a remediation action. In particular, the security posture visualization can include a remediation action for an alert associated with a security incident. The security management client 130 can receive an indication to perform the remediation action associated with the security incident. Based on receiving the indication to execute the remediation action, the security management client 130 can communicate the indication to execute the remediation action to cause execution of the remediation action.

Figure 1C:
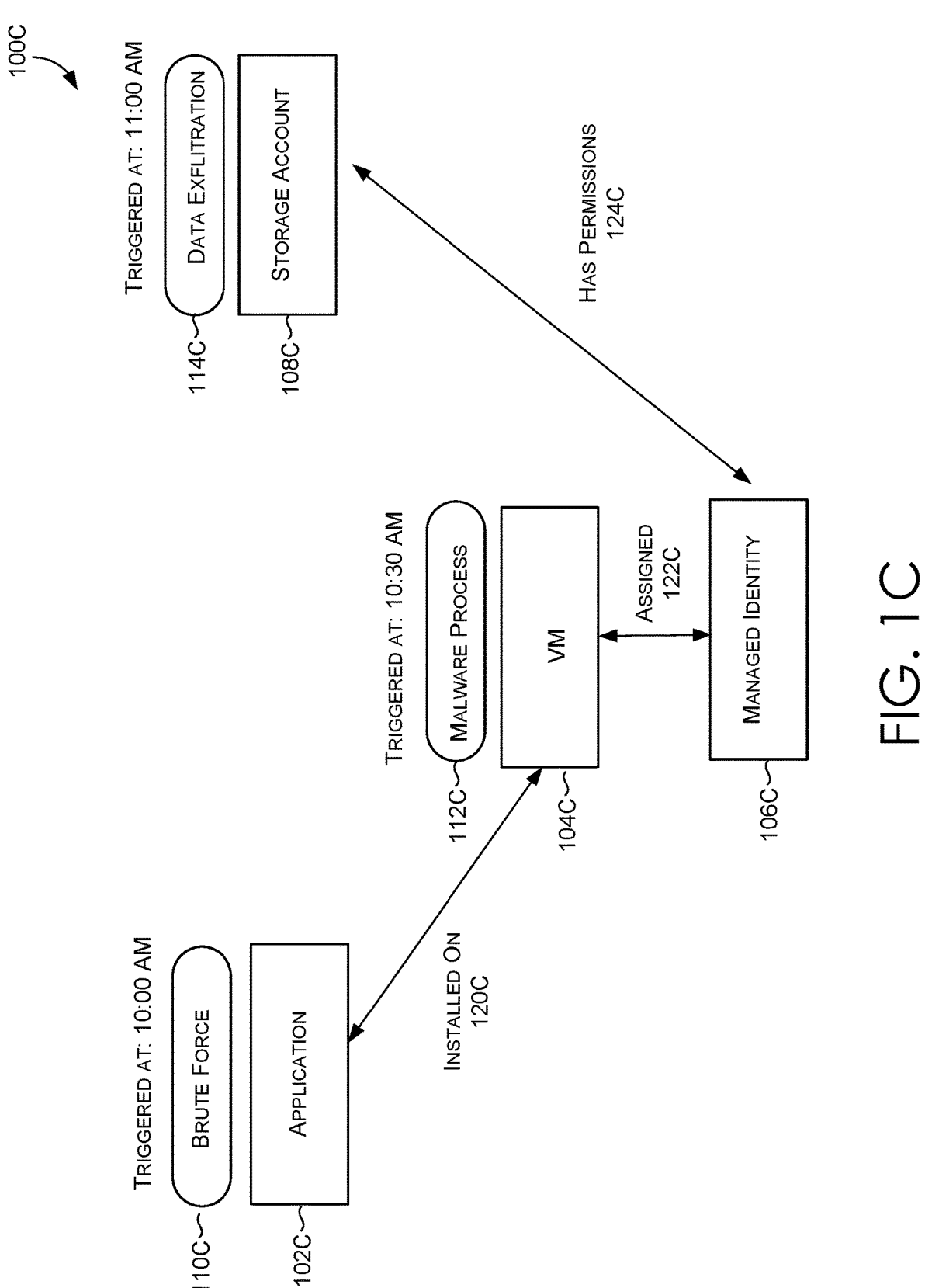
FIGS. 1C and 1D are block diagrams of exemplary alerts correlated for providing security incident management using a latent-context alert correlation engine, in accordance with aspects of the technology described herein.

With reference to FIG. 1C, FIG. 1C illustrates a security management system interface 100C that illustrates a latent-context alert correlation schematic 100C. The latent-context alert correlation schematic 100C includes application 102C, VM 104C, managed identity 106C, and storage account 108C. The latent-context alert correlation schematic 100C further includes a plurality of alerts (i.e., brute force 110C, malware process 112C, and data exfiltration 114C), and a plurality of latent-context connections (i.e., installed on 120C, assigned 122C, and has permissions 124C). Application 102C, VM 104C, and storage account 108C may operate in a computing environment associated with a security management system 110A that monitors the computing environment for security issues.

Upon detecting a security issue, an alert is generated for the security issue—at a time associated with the security issue. For example, an alert for brute force 110C is triggered at 10:00 am, an alert for malware process 112C is triggered at 10:30 am, and an alert for data exfiltration 114C is triggered at 11:00 am. The alerts are associated with a security graph; however the alerts are not correlated into a security incident because the alerts do not share a common entity in the security graph. For example, the alerts can communicate independently-implicitly or explicitly indicating that the alerts are not correlated via the security graph.

As discussed herein, alert security data corresponding to the alerts—including latent-context connection data may be used—along with a latent-context alert correlation graph model to identify latent-context connections between the alerts. For example, latent-context connections, such as, application 102 is installed on 120C VM 104C; VM 104C is assigned 122C to managed identity 106C; and managed identity 106C has permissions 124C to storage account 108C. Based on the latent-context connections, an inference is made that the alert are related, such that the alerts are correlated into a single security incident.

Figure 1D:
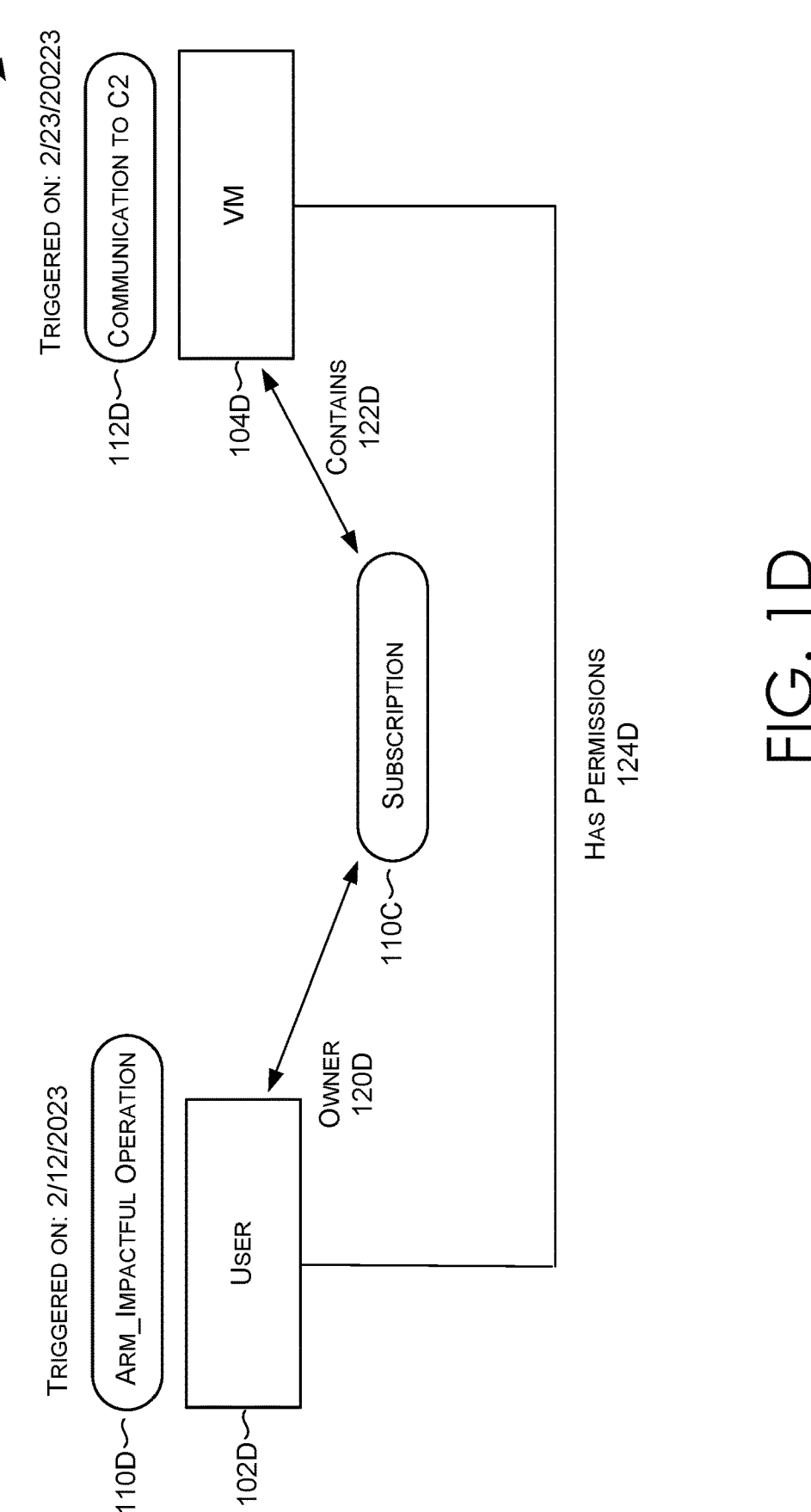

With reference to FIG. 1D, FIG. 1D illustrates a security management system interface 100D that illustrates a latent-context alert correlation schematic 100D. The latent-context alert correlation schematic 100D includes user 102D and VM 104D. The latent-context alert correlation schematic 100D further includes a plurality of alerts (i.e., arm_impactful operation 110D and communication to C2 (command and control) 112D), and a plurality of latent-context connections (i.e., owner 120D, contains 122D, has permissions 124D). User 102D and VM 104D may operate in a computing environment associated with a security management system 110A that monitors the computing environment for security issues.

Upon detecting a security issue, an alert is generated for the security issue—at a date associated with the security issue. For example, an arm_impactful operation 110D is triggered on Feb. 12, 2023 and an alert for data communication to C2 112D is triggered on Feb. 23, 2023. The alerts are associated with a security graph; however the alerts are not correlated into a security incident because the alerts do not share a common entity in the security graph.

As discussed herein, alert security data corresponding to the alerts—including latent-context connection data may be used—along with a latent-context alert correlation graph model to identify latent-context connections between the alerts. For example, latent-context connections, such as, user 102D is the owner 120D of subscription 110C; subscription 110C contains 122D VM 104D; and user 102D has permissions 124D to VM. Based on the latent-context connections, an inference is made that the alerts are related, such that the alerts are correlated into a single security incident. The inference may be associated with an inference score based on the type of latent-context connection associated with the latent-context connection. Other variations and combinations of computing resources, latent-context connections, and interferences are contemplated with embodiments described herein.

Figure 2A:
FIG. 2A is a block diagram of an exemplary security management system for providing security incident management using a latent-context alert correlation engine, in accordance with aspects of the technology described herein.
Figure 2B:
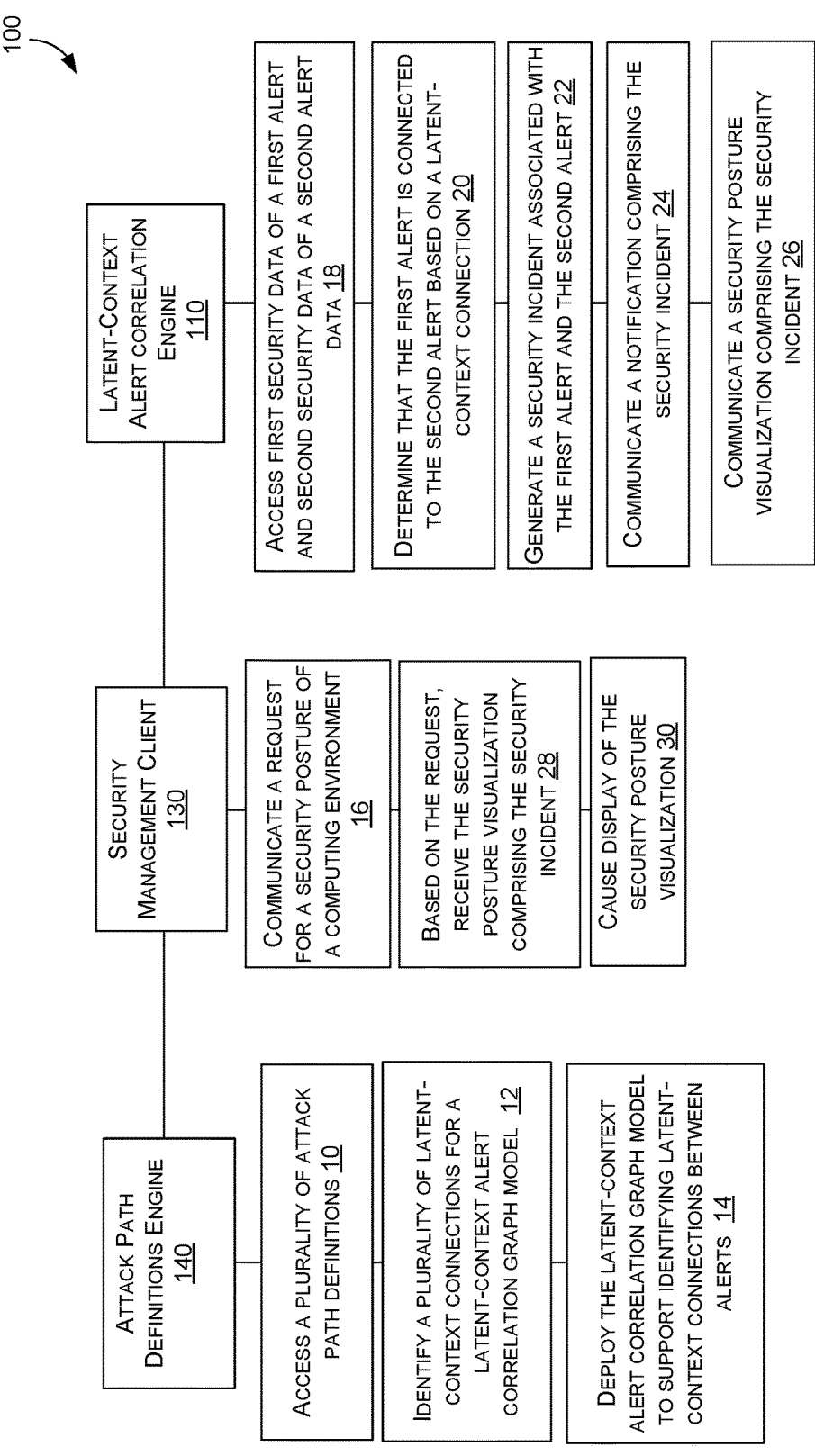
FIG. 2B is a block diagram of an exemplary security management system for providing security incident management using a latent-context alert correlation engine, in accordance with aspects of the technology described herein.

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example cloud computing system 100 in which methods of the present disclosure may be employed. In particular, FIG. 2A shows a high level architecture of the cloud computing system 100 in accordance with implementations of the present disclosure. Among other engines, managers, generators, selectors, or components not shown (collectively referred to herein as "components"), the technical solution cloud computing system 100 corresponds to FIGS. 1A and 1B.

With reference to FIG. 2A, FIG. 2A illustrates a security management system 100A having latent-context alert correlation engine 110, attack path definitions engine 140, latent-context alert correlation graph model 150, and latent-context connection data API 160. The security management system 100A further includes security incident management engine 120 including security graph API 122. The security management client 130 includes incident management client 132 and security incident interface data 134.

The attack path definitions engine 140 access a plurality of attack path definitions and identifies a plurality of latent-context connections for a latent-context alert correlation graph model 150. The attack path definitions engine 140 deploys the latent-context alert correlation graph model 150 to support identifying latent-context connections between alerts. In this way, the attack path definitions engine 140 supports identifying a plurality of latent-context connections based on a plurality of attack path definitions associated with historical alerts, where the plurality of latent-context connections are associated with the latent-context alert correlation graph model 150. The plurality of latent-context connections are based on latent-context connections types including permissions, containing, connectivity, installation, and subscription, where the latent-context connections types are not entity associations in a security graph.

The security incident management engine 120 access first security data of a first alert and second security data of a second alert via the security graph API 122 and determines that the first alert is not connected to the second alert based on the first alert and the second alert not having a common entity identified in a security graph. The security incident management engine 120 uses the security graph API 122 that is associated with a plurality of alerts from security providers, where a first set of alerts are associated with a first security incident; and where a second set of alerts are not associated with a second security incident, the second set of alerts comprising the first alert and the second alert.

The latent-context alert correlation engine 110 uses the first security data, the second security data and the latent-context correlation graph model 150 to determine that the first alert is connected to the second alert based on a latent-context connection. The latent-context connection is a derived attack-path-based connection that maps security data in a latent-context alert correlation graph. The latent-context alert correlation engine 110 may further use the latent-context connection data API 160 to access latent-context connection data associated with the first alert or the second alert. The latent-context connection data is associated with the latent-context alert correlation graph model, where the latent-context alert correlation graph model indicates types of latent-context connection data to be retrieved for the first alert or the second alert.

The latent-context alert correlation engine 110 generates a latent-context alert correlation graph based on the first security data and the second security data, where the latent-context alert correlation graph includes a first node associated with the first alert and a second node associated with the second alert, the first node is connected to the second node via the latent-context connection. Based on determining that the first alert is connected to the second alert, the latent-context alert correlation engine 110 generates a security incident associated with the first alert and the second alert. The latent-context alert engine 110 can generate a notification comprising the security incident. The security incident management engine 120 supports generating a security posture visualization comprising the security incident, the security incident comprises one or more latent-context connections between the first alert and the second alert. The security incident can be associated with a remediation action, where the remediation action is executable to address a security threat associated with the security incident.

The security incident client 130 supports communicating a request for a security posture of the computing environment. Based on the request, the security incident client 130 receives security posture visualization associated with the computing environment, where the security posture visualization comprises the notification comprising the security incident. The security incident client 130 can include incident management client 132 and security incident interface data 134 that includes the security posture visualization to support causing display of the security posture visualization, the security incident, and the remediation action.

With reference to FIG. 2B, FIG. 2B illustrates a cloud computing system having latent-context alert correlation engine 110, security management client 130, and attack path definitions 140. At block 10, the attack path definitions engine 140 accesses a plurality of attack path definitions; at block 12, identifies a plurality of latent-context connections for a latent-context alert correlation graph model; and at block 14, deploys the latent-context alert correlation graph model to support identify latent-context connections between alerts.

At block 16, the security management client 130 communicates a request for a security posture of a computing environment. At block 18, a latent-context alert correlation engine 110 accesses first security data of a first alert and second security data of a second alert data; at block 20, determines that the first alert is connected to the second alert based on a latent-context connection; and at block 22, generates a security incident associated with the first alert and the second alert. At block 24, the latent-context alert correlation engine 110 communicates a notification comprising security; and at block 26, communicates a security posture visualization comprising the security incident. At block 28, the security management client, based on the request receive the security posture visualization comprising the security incident; and at block 30, causes display of the security posture visualization.

Example Methods

Figure 4:
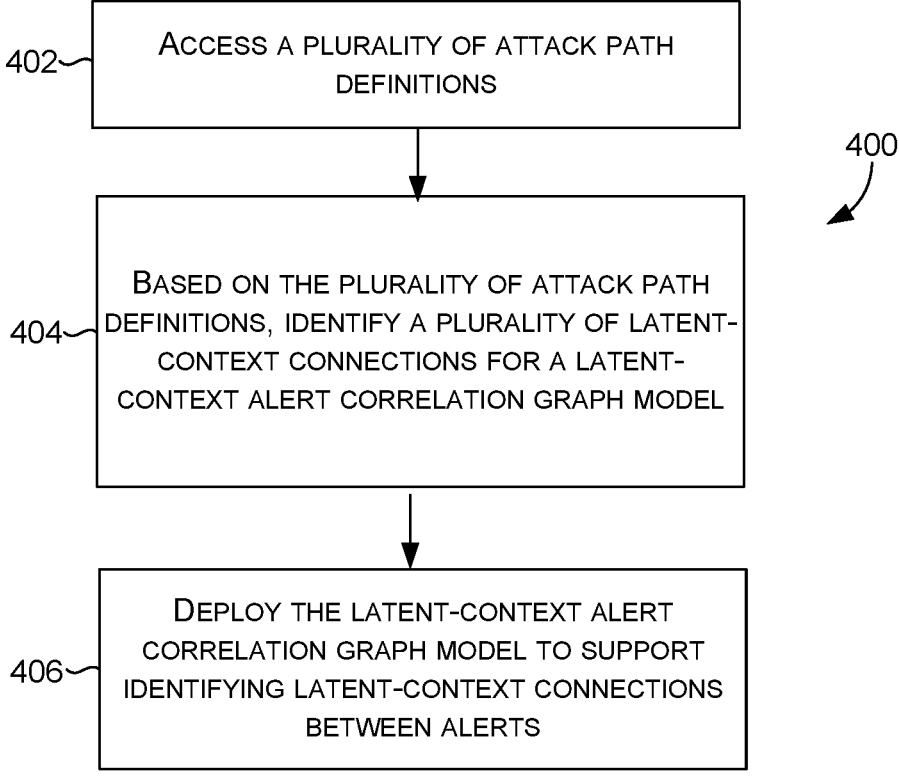
FIG. 4 provides a second exemplary method of providing security incident management using a latent-context alert correlation engine, in accordance with aspects of the technology described herein.

With reference to FIGS. 3, 4, and 5, flow diagrams are provided illustrating methods for providing security incident management using a latent-context alert correlation engine in a security management system. The methods may be performed using the security management system described herein. In embodiments, one or more computer-storage media having computer-executable or computer-useable instructions embodied thereon that, when executed, by one or more processors can cause the one or more processors to perform the methods (e.g., computer-implemented method) in the security management system (e.g., a computerized system).

Turning to FIG. 3, a flow diagram is provided that illustrates a method 300 for providing security incident management using a latent-context alert correlation engine in a security management system. At block 302, first security data of a first alert and second security data of a second alert is accessed. At block 304, based on the first security data, the second security data, and a security graph, a determination is made that the first alert is not connected to the second alert based on the first alert and the second alert not having a common entity identified in the security graph. At block 306, using the first security data, the second security data, and a latent-context alert correlation graph model, a determination is made that the first alert is connected to the second alert based on a latent-context connection. At block 308, based on determining that the first alert is connected to the second alert, generate a security incident associated with the first alert and the second alert. At block 310, a request for a security posture of the computing environment is received. At block 312, a security posture visualization associated with the security incident and the computing environment is communicated.

Turning to FIG. 4, a flow diagram is provided that illustrates a method 400 for providing security incident management using a latent-context alert correlation engine in a security management system. At block 402, a plurality of attack path definitions is accessed. At block 404, based on the plurality of attack path definitions, a plurality of latent-context connections for a latent-context alert correlation graph model are identified. At block 406, the latent-context alert correlation graph model is deployed to support identifying latent-context connections between alerts.

Turning to FIG. 5, a flow diagram is provided that illustrates a method 500 for providing security incident management using a latent-context alert correlation engine in a security management system. At block 502, first security data of a first alert and second security data of a second alert is accessed. At block 504, using the first security data and the second security data, determine the first alert is connected to the second alert based on a latent-context connection. At block 506, based on determining that the first alert is connected to the second alert, a security incident is generated for the first alert and the second alert. At block 506, a notification comprising the security incident is communicated.

Technical Improvement

Embodiments of the present invention have been described with reference to several inventive features (e.g., operations, systems, engines, and components) associated with a security management system. Inventive features described include: operations, interfaces, data structures, and arrangements of computing resources associated with providing the functionality described herein relative with reference to a latent-context alert correlation engine. Functionality of the embodiments of the present invention have further been described, by way of an implementation and anecdotal examples—to demonstrate that the operations for providing the latent-context alert correlation engine as a solution to a specific problem in security management technology to improve computing operations in security management systems. Overall, these improvements result in less CPU computation, smaller memory requirements, and increased flexibility in security management systems when compared to previous conventional security management system operations performed for similar functionality.

Additional Support for Detailed Description of the Invention

Example Distributed Computing System Environment

Figure 6:
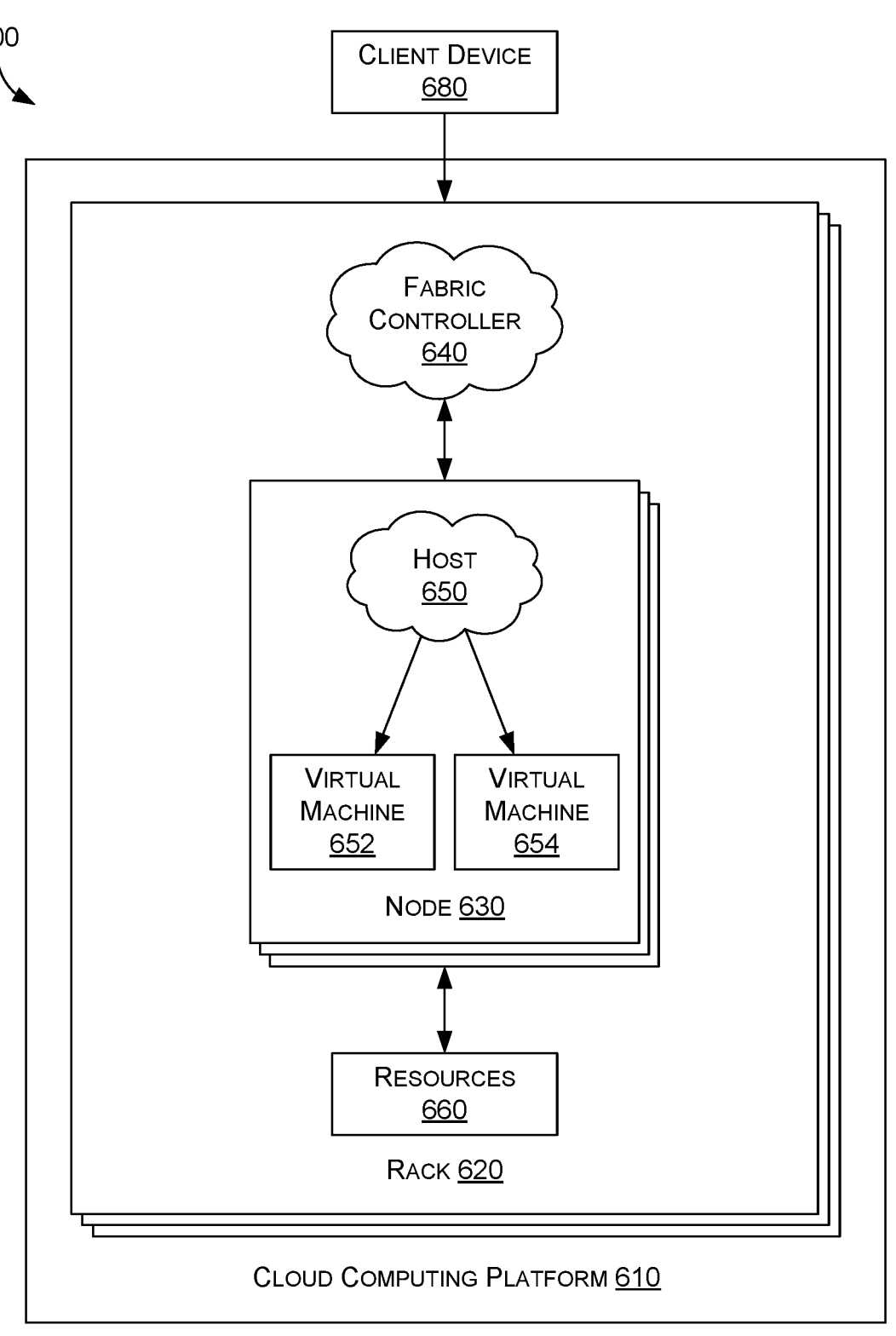
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs). Example Computing Environment Having briefly described an overview of embodiments of the present invention, an example operating environment in which embodiments of the present invention may be implemented is described below in order to provide a general context for various aspects of the present invention. Referring initially to FIG. 6 in particular, an example operating environment for implementing embodiments of the present invention is shown and designated generally as computing device 600. Computing device 600 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 7:
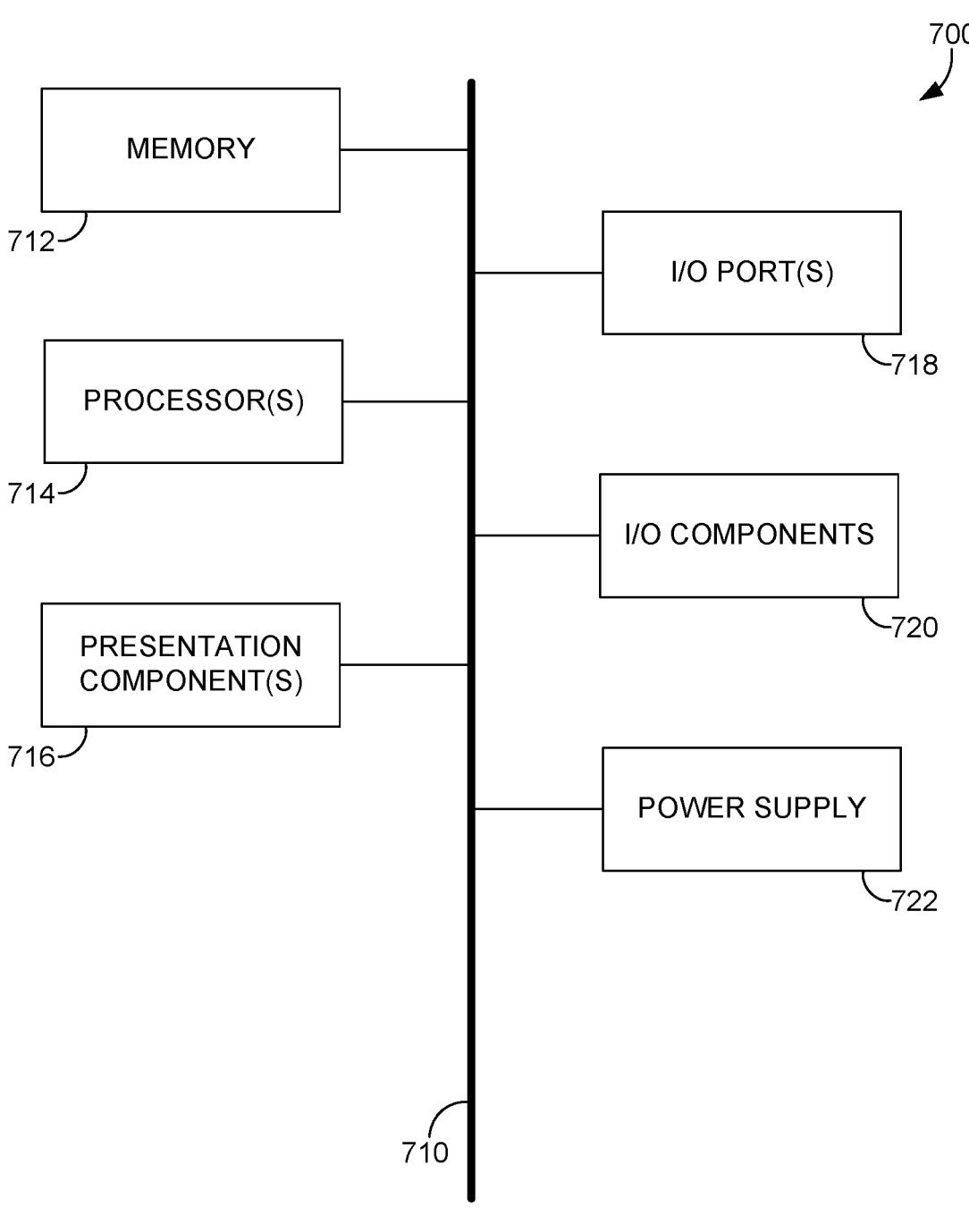
FIG. 7 is a block diagram of an exemplary computing environment suitable for use in implementing aspects of the technology described herein.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:

one or more computer processors;

computer memory storing computer-useable instructions that, when used by the one or more computer processors, cause the one or more computer processors to perform operations, the operations comprising:

accessing first security data of a first alert and second security data of a second alert, wherein the first alert and the second alert are associated with a computing environment;

determining that the first alert is not connected to the second alert based on the first alert and the second alert not having a common entity identified in a security graph;

using the first security data, the second security data, and a latent-context alert correlation graph model associated with an attack path definitions engine that supports identifying latent-context connections between alerts with correlations in the security graph, determining that the first alert is connected to the second alert based on a latent-context connection, wherein the latent-context connection is a derived attack-path-based connection that maps security data in a latent-context alert correlation graph associated with the latent-context alert correlation graph model, wherein the derived attack-path-based connection is identified based on a plurality of known attack objects associated with a type of attack on the computing environment, wherein the latent-context alert correlation graph model graphs security data for alerts without correlations based on the security graph and security graph data, wherein the latent-context connections are based on latent-context connection types include one or more of: permission, installation, and subscription, wherein the latent-context connection types are not entity associations in the security graph, based on determining that the first alert is connected to the second alert, generating a security incident associated with the first alert and the second alert;

receiving a request for a security posture of the computing environment; and communicating a security posture visualization associated with the computing environment, wherein the security posture visualization comprises the security incident.

2. The system of claim 1, wherein the attack path definitions engine is associated with a latent-context alert correlation engine that supports identifying a plurality of latent-context connections based on a plurality of attack path definitions associated with historical alerts, wherein the plurality of latent-context connections are associated with the latent-context alert correlation graph model.

3. The system of claim 1, wherein the security posture visualization is associated with a notification, the security posture visualization comprising a first plurality of alerts that are not associated with security incidents and a second plurality of alerts that are associated with security incidents, wherein the first plurality of alerts and the second plurality of alerts are provided in the security posture visualization based on corresponding inference scores.

4. The system of claim 1, the operations further comprising accessing latent-context connection data associated with the first alert or the second alert, wherein the latent-context connection data is associated with the latent-context alert correlation graph model, wherein the latent-context alert correlation graph model indicates types of latent-context connection data to be retrieved for the first alert or the second alert.

5. The system of claim 1, the operations further comprising generating the latent-context alert correlation graph based on the first security data and the second security data, wherein the latent-context alert correlation graph comprises a first node associated with the first alert and a second node associated with the second alert, the first node is connected to the second node via the latent-context connection.

6. The system of claim 1, wherein a security incident management engine comprises a security graph Application Programming Interface (API) that is associated with a plurality of alerts from security providers, wherein a first set of alerts are associated with a first security incident; and wherein a second set of alerts are not associated with a second security incident, the second set of alerts comprising the first alert and the second alert.

7. The system of claim 1, further comprising a security incident management engine that supports generating the security posture visualization comprising the security incident, wherein the security incident comprises one or more latent-context connections between the first alert and the second alert.

8. The system of claim 1, wherein the security incident is associated with a remediation action, wherein the remediation action is executable to address a security threat associated with the security incident.

9. The system of claim 1, the operations further comprising:

communicating, from a security management client, the request for the security posture of the computing environment;

based on the request, receiving the security posture visualization associated with the computing environment, wherein the security posture visualization comprises comprising the security incident; and causing display of the security posture visualization.

10. The system of claim 1, the operations further comprising:

accessing a plurality of attack path definitions;

based on the plurality of attack path definitions, identifying a plurality of latent-context connections for the latent-context alert correlation graph model; and deploying the latent-context alert correlation graph model to support identifying latent-context connections between a plurality of alerts.

11. One or more computer-storage media having computer-executable instructions embodied thereon that, when executed by a computing system having a processor and memory, cause the processor to perform operations, the operations comprising:

accessing first security data of a first alert and second security data of a second alert, wherein the first alert and the second alert are not connected based on the first alert and the second alert not having a common entity identified in a security graph;

using the first security data, the second security data, and a latent-context alert correlation graph model associated with an attack definitions engine that supports identifying latent-context connections between alert without correlations in the security graph, determining that the first alert is connected to the second alert based on a latent-context connection, wherein the latent-context connection is a derived attack-path-based connection that maps security data in a latent-context alert correlation graph associated with the latent-context alert correlation graph model, wherein the derived attack-path-based connection is identified based on a plurality of known attack objects associated with a type of attack on a computing environment, wherein the latent-context alert correlation graph model graphs security data for alerts without correlations based on the security graph and security graph data, wherein the latent-context connections are based on latent-context connection types include one or more of: permission, installation, and subscription, wherein the latent-context connection types are not entity associations in the security graph; and based on determining that the first alert is connected to the second alert, generating a security incident associated with the first alert and the second alert; and communicating a notification comprising the security incident.

12. The media of claim 11, the operations further comprising accessing latent-context connection data associated with the first alert or the second alert, wherein the latent-context connection data is associated with the latent-context alert correlation graph model, wherein the latent-context alert correlation graph model indicates types of latent-context connection data to be retrieved for the first alert or the second alert.

13. The media of claim 11, the operations further comprising generating the latent-context alert correlation graph based on the first security data and the second security data, wherein the latent-context alert correlation graph comprises a first node associated with the first alert and a second node associated with the second alert, the first node is connected to the second node via the latent-context connection.

14. The media of claim 11, wherein the notification is associated with a security posture visualization comprising a first plurality of alerts that are not associated with security incidents and a second plurality of alerts that are associated with security incidents, wherein the first plurality of alerts and the second plurality of alerts are provided in the security posture visualization based on corresponding inference scores.

15. The media of claim 11, the operations further comprising:
  accessing a plurality of attack path definitions;
  based on the plurality of attack path definitions, identifying a plurality of latent-context connections for the latent-context alert correlation graph model; and
  deploying the latent-context alert correlation graph model to support identifying latent-context connections between a plurality of alerts.

16. A computer-implemented method, the method comprising:
  accessing first security data of a first alert and second security data of a second alert, wherein the first alert and the second alert are not connected based on the first alert and the second alert not having a common entity identified in a security graph, wherein the first alert and the second alert are associated with a computing environment;
  using the first security data, the second security data, and a latent-context alert correlation graph model associated with an attack path definitions engine that supports identifying laten-context connections between alerts without correlations in the security graph, determining that the first alert is connected to the second alert based on a latent-context connection,
  wherein the latent-context connection is a derived attack-path-based connection that maps security data in a latent-context alert correlation graph associated with the latent-context alert correlation graph model, wherein the derived attack-path-based connection is identified based on a plurality of known attack objects associated with a type of attack on the computing environment,
  wherein the latent-context alert correlation graph model graphs security data for alerts without correlations based on the security graph and security graph data,
  wherein the latent-context connections are based on latent-context connection types include one or more of: permission, installation, and subscription,
  wherein the latent-context connection types are not entity associations in the security graph; and
  based on determining that the first alert is connected to the second alert, generating a security incident associated with the first alert and the second alert.

17. The method of claim 16, the method further comprising accessing latent-context connection data associated with the first alert or the second alert, wherein the latent-context connection data is associated with the latent-context alert correlation graph model, wherein the latent-context alert correlation graph model indicates types of latent-context connection data to be retrieved for the first alert or the second alert.

18. The method of claim 16, the method further comprising generating the latent-context alert correlation graph based on the first security data and the second security data, wherein the latent-context alert correlation graph comprises a first node associated with the first alert and a second node associated with the second alert, the first node is connected to the second node via the latent-context connection.

19. The method of claim 16, the method further comprising:
  receiving a request for a security posture of the computing environment; and
  communicating a security posture visualization associated with the computing environment, wherein the security posture visualization comprises a first plurality of alerts that are not associated with security incidents and a second plurality of alerts that are associated with security incidents, wherein the first plurality of alerts and the second plurality of alerts are provided in the security posture visualization based on corresponding inference scores.

20. The method of claim 16, the method further comprising:
  accessing a plurality of attack path definitions;
  based on the plurality of attack path definitions, identifying a plurality of latent-context connections for the latent-context alert correlation graph model; and
  deploying the latent-context alert correlation graph model to support identifying latent-context connections between a plurality of alerts.

* * * * *